Patented Feb. 28, 1939

2,148,470

UNITED STATES PATENT OFFICE 2,148,470

PROCESS OF PURIFYING SODIUM HYDROXIDE

Everett C. Hughes, Cleveland, Ohio, assignor to The Standard Oil Company, Cleveland, Ohio, a corporation of Ohio No Drawing. Application January 15, 1936, Serial No. 59,316

6 Claims. (Cl. 23—184)

In United States Patent No. 2,020,932 there is set forth a process of purifying sodium hydroxide which is contaminated with mercaptides and thus waste otherwise requiring to be discarded. In extensive operations with this, I have discovered that by means of a further provision, it now becomes possible to surprisingly cut down the sulphur consumption requisite and at the same time very greatly promote the end result.

To the accomplishment of the foregoing and related ends, the invention, then, comprises the features hereinafter fully described, and particularly pointed out in the claims, the following description setting forth in detail certain illustrative embodiments of the invention, these being indicative however, of but a few of the various ways in which the principle of the invention may be employed.

The caustic soda which is to be purified, for instance a caustic soda solution which has become loaded up with mercaptides by treating petroleum distillates, is in accordance with the present invention subjected to washing with elemental sulphur dissolved in an organic solvent, and at the same time a metallic sulphide catalyst is brought into contact in the reaction zone in suitable manner. Advantageously, the sodium hydroxide is flowed in countercurrent relation to the solution of elemental sulphur in an organic solvent, such as benzol, aliphatic hydrocarbons, naphthenic hydrocarbons, etc., the sodium hydroxide and the solution of sulphur being thoroughly mixed and then allowed to separate, the organic solvent being immiscible with sodium hydroxide solution, but being a solvent for the reaction products of sulphur and the mercaptide. In the reaction zone I provide a contacting catalyst of metallic sulphide, as cadmium sulphide, mercury sulphide, lead sulphide, iron sulphide, or sulphides of antimony, arsenic, bismuth, copper, tin, aluminum, chromium, etc. By employing a precipitated form of metallic sulphide, it may be agitated and sufficiently suspended in the sulphur solution during mixture with the sodium hydroxide, and then allow separtion from the sodium hydroxide, being selectively carried in the oily-like vehicle of the sulphur solution or in the caustic. Preferably, the sulphide catalyst may be in the form of larger contact-size pieces, as for instance pea-size, of galena or like sulphide, or to a similar extent the sulphide may be precipitated as a deposit on pea-size pieces of inert carrier. With the catalyst thus disposed, the liquid may be flowed through and about it, in contacting relation, as for instance in a suitable container or column in which the catalyst is placed at points in the path of the liquid flowed. To the extent that the sulphur can be picked up by the alkali mercaptide-containing solution, the sodium hydroxide solution may be mixed with the hydrocarbon solution of sulphur, the sodium hydroxide solution be separated, and then be brought into contact with the catalyst in suitable manner, as by flowing therethrough, and then washing the sodium hydroxide solution again with a hydrocarbon solution of sulphur, and separating the sodium hydroxide solution. In all the various cases, the sulphur is not carried into the finished petroleum products, but accomplishes its results apart therefrom, and the sulphur-mercaptide reaction is not only made more energetic by the catalyst, but there is a peculiar reduction in the amount of sulphur used up.

As an example: The caustic soda solution which is loaded up with mercaptides, is thoroughly mixed with a saturated solution of elemental sulphur in a petroleum naphtha of 62° Bé. gravity, the liquids being forced through and over spaced beds of broken galena. In passing the zone of agitation and commingling, the aqueous caustic soda, now purified of its mercaptides, separates gravitationally from the oil-like sulphur solution, and is ready for evaporation or for use immediately.

Other modes of applying the principle of the invention may be employed, change being made as regards the details described, provided the features stated in any of the following claims, or the equivalent of such, be employed.

I therefore particularly point out and distinctly claim as my invention:—

1. A process of purifying aqueous sodium hydroxide solutions containing mercaptides, which comprises washing the mercaptide-containing sodium hydroxide solution with sulphur and an organic solvent immiscible with sodium hydroxide solution and in which both sulphur and the reaction product between the sulphur and the mercaptide are soluble, catalyzing the reaction between the mercaptides and the added sulphur by the presence of a metallic sulphide catalyst whereby the amount of sulphur consumed by the reaction is cut down over that which would be required in the absence of the catalyst and separating the organic solution from the aqueous sodium hydroxide solution.

2. A process of purifying aqueous sodium hydroxide solutions containing mercaptides, which comprises washing the mercaptide-containing sodium hydroxide solution with sulphur and an organic solvent immiscible with sodium hydroxide solution and in which both sulphur and the reaction product between the sulphur and the mercaptide are soluble, the washing being in a zone in which the liquids flow in contact with a metallic sulphide catalyst for the sulphur reaction, and separating the organic solution from the aqueous sodium hydroxide solution.

3. A process of purifying aqueous sodium hydroxide solutions containing mercaptides, which comprises washing the mercaptide-containing sodium hydroxide solution with sulphur and an organic solvent immiscible with sodium hydroxide solution and in which both sulphur and the reaction product between the sulphur and the mercaptide are soluble, maintaining a finely divided metallic sulphide catalyst for the sulphur reaction in suspension in the organic solvent during the intermixing of the sodium hydroxide and the organic solvent, and finally separating the organic solution with suspended metallic sulphide catalyst from the aqueous sodium hydroxide solution.

4. A process of purifying aqueous sodium hydroxide solutions containing mercaptides, which comprises washing the mercaptide-containing sodium hydroxide solution with sulphur and an organic solvent immiscible with sodium hydroxide solution and in which both sulphur and the reaction product between the sulphur and the mercaptide are soluble, maintaining a finely divided metallic sulphide catalyst for the sulphur reaction in suspension in the sodium hydroxide solution, and finally separating the catalyst from the aqueous sodium hydroxide solution.

5. A process of purifying aqueous sodium hydroxide solutions containing mercaptides, which comprises washing the mercaptide-containing sodium hydroxide solution with sulphur and an organic solvent immiscible with sodium hydroxide solution and in which both sulphur and the reaction product between the sulphur and the mercaptide are soluble, maintaining a finely divided metallic sulphide catalyst for the sulphur reaction in suspension in the mixture of organic solvent and sodium hydroxide solution, and separating the organic solution and separating the catalyst from the aqueous sodium hydroxide solution.

6. A process of purifying aqueous sodium hydroxide solutions containing mercaptides, which comprises washing the mercaptide-containing sodium hydroxide solution with sulphur and an organic solvent immiscible with sodium hydroxide solution and in which both sulphur and the reaction product between the sulphur and the mercaptide are soluble, separating the organic solution and the aqueous sodium hydroxide which has taken up sulphur therefrom, contacting the aqueous sodium hydroxide solution containing mercaptides and sulphur with a metallic sulphide catalyst for catalyzing reaction between mercaptides and sulphur, then washing the sodium hydroxide solution with sulphur and an organic solvent immiscible with the sodium hydroxide solution.

EVERETT C. HUGHES.